US005709315A

United States Patent [19]

Kähler et al.

[11] Patent Number: 5,709,315

[45] Date of Patent: Jan. 20, 1998

[54] METHOD AND APPARATUS FOR REMOVING NEWSPAPERS AND SIMILAR FOLDED SHEET UNITS FROM A STACK

[75] Inventors: Steen Kähler, Tikøb; Karl Hartmeyer, Lyngby; Keld Boysen, Hvidovre, all of Denmark

[73] Assignee: De Berlingske Dagblade A/S, Copenhagen, Denmark

[21] Appl. No.: 379,439

[22] PCT Filed: Jul. 16, 1993

[86] PCT No.: PCT/DK93/00241

§ 371 Date: Apr. 6, 1995

§ 102(e) Date: Apr. 6, 1995

[87] PCT Pub. No.: WO94/03877

PCT Pub. Date: Feb. 17, 1994

[30] Foreign Application Priority Data

Aug. 7, 1992 [DK] Denmark .................................. 0997/92

[51] Int. Cl.$^{6}$ .............................. G07F 11/00; B65H 3/24; B65H 3/00; B65G 59/07

[52] U.S. Cl. .......................... 221/155; 221/194; 221/240; 271/42; 271/141; 271/128; 414/795.6; 414/796.9

[58] Field of Search ................................ 221/1, 155, 22, 221/23, 66, 46, 47, 49, 55, 56, 187, 193, 194, 197, 287, 198, 213–217, 226, 240, 253, 254, 279, 280; 271/42, 141, 128, 148, 160; 414/796.9, 795.6

[56] References Cited

U.S. PATENT DOCUMENTS

| | | | |
|---|---|---|---|
| 2,444,389 | 6/1948 | Wagner | 221/215 |
| 2,546,352 | 3/1951 | Weaver | 221/155 X |
| 3,250,432 | 5/1966 | Green et al. | 221/194 X |
| 4,008,828 | 2/1977 | Branchaud | 221/241 |
| 4,131,213 | 12/1978 | Tamura et al. | 221/155 X |
| 4,501,379 | 2/1985 | Halone et al. | 221/240 |

FOREIGN PATENT DOCUMENTS

| | | |
|---|---|---|
| 37905/72 | 7/1973 | Australia . |
| 138196 | 2/1978 | Denmark . |
| 176361 | 9/1985 | European Pat. Off. . |
| 165504 | 12/1985 | European Pat. Off. . |
| 282457 | 9/1988 | European Pat. Off. . |
| 365417 | 4/1990 | European Pat. Off. . |
| 424329 | 4/1991 | European Pat. Off. . |
| 2353477 | 4/1975 | Germany . |
| 2518429 | 11/1976 | Germany . |
| 2557880 | 7/1977 | Germany . |
| 382705 | 2/1976 | Sweden . |

*Primary Examiner*—William E. Terrell
*Assistant Examiner*—Richard Chandler
*Attorney, Agent, or Firm*—Dennison, Meserole, Pollack & Scheiner

[57] ABSTRACT

Folded sheet units, such as newspapers and magazines are successively removed from a stack of such sheet units by inserting at least one sheet engaging member such as a pin in the fold between adjacent sheet layers of the sheet unit to be removed. The pin is subsequently moved transversely towards the fold so as to withdraw the sheet unit from the stack to a display position. This principle of withdrawing newspapers form a stack is used in a vending machine for newspapers or magazines.

35 Claims, 5 Drawing Sheets

METHOD AND APPARATUS FOR REMOVING NEWSPAPERS AND SIMILAR FOLDED SHEET UNITS FROM A STACK

The present invention relates to a method for successively removing folded sheet units, such as newspapers, magazines or the like, each comprising superposed sheet layers, from a stack of such sheet units.

BACKGROUND OF THE INVENTION

In vending machines and other apparatuses for dispensing products one by one, products such as newspapers, magazines or the like folded sheet units comprising superposed sheet layers are normally arranged in a stack of such sheet units. The sheet units should then be removed one by one from one end of the stack and delivered to a customer or user.

Various attempts have been made to ensure reliable separation of the sheet unit to be removed from the remaining stack. Examples of known apparatuses are disclosed in Danish patent No. 138,196, European patent publications Nos. 0,165,504, 0,282,457, and 0,424,329, German Offenlegungsschrift Nos. 23 53 477, 25 18 429, and 25 57 880, and in U.S. Pat. No. 4,008,828.

In the majority of these prior art apparatus the sheet unit to be removed is engaged by frictional forces and pushed from the stack in the direction of the plane of the sheet unit. In European patent publication No. 0,424,329 it is proposed to remove newspapers and magazines from a stack by means of a pair of rotating discs having points or needles extending from the peripheral surface thereof. The prior art devices may function satisfactorily when the sheet units stacked are relatively thin and when the sheet layers of the unit are relatively stiff. However, when the sheet units are relatively thick and comprise a great plurality of sheet layers, malfunction may occur.

OBJECTS OF THE INVENTION

The present invention provides a method and apparatus by means of which a single folded sheet unit having a thickness within a wide range may efficiently be removed from a stack of such units.

Thus, the present invention provides a method for successively removing folded sheet units, such as newspapers, magazines, or the like each comprising superposed sheet layers, from a stack of such sheet units, and the method according to the invention is characterized in inserting at least one sheet engaging member between adjacent sheet layers of the sheet unit to be removed adjacent to the fold thereof, and subsequently moving the sheet engaging member transversely towards the fold so as to withdraw the sheet unit or sheet assembly from the stack. Thus, the sheet engaging member will come into engagement with the inner side of the fold of one of the sheet layers of the unit. Consequently, the sheet unit will be dragged rather than pushed, when it is removed from the stack. As the dragging force applied by the sheet engaging member is applied to at least the outer folded sheet layer or layers of the unit a satisfactory removal of all unit layers may be ensured even when the folded unit is relatively thick and heavy so that the frictional forces between the unit to be removed and the adjacent unit of the stack are relatively high.

It is sufficient to insert a sheet engaging member between the sheet layers of the unit to be removed at only one of the edges of the unit extending transversely or substantially at right angles to the fold. In the preferred embodiment, however, a pair of oppositely directed sheet engaging members are inserted into the sheet unit at opposite edge portions thereof. In such case the necessary depth of penetration of the sheet engaging member into the sheet unit may be substantially smaller than when only one sheet engaging member is used. Furthermore, such opposite pair of sheet engaging members may grip the sheet unit to be removed more safely.

Each sheet engaging member preferably comprises a pin or rod member which in its operative position is preferably substantially parallel with the fold of the sheet unit to be removed.

The method according to the invention may be used in any case where folded sheet units should successively be removed from a stack of such units. As an example, the stack of sheet units may be located within a vending machine, and said at least one sheet engaging member, which has been inserted into the sheet unit to be removed, may then be moved along a predetermined track or path from said stack to a position from which the sheet unit may be delivered to a customer.

The stack of sheet units may be stationary, and said at least one sheet engaging member should then be moved in the longitudinal direction of the stack by one increment corresponding to the thickness of one folded sheet unit, each time a sheet unit has been removed from the stack. Alternatively and preferably, said at least one sheet engaging member may be inserted into the successive sheet units at the same position, the stack of sheet units being advanced when a sheet unit has been removed so as to position a new sheet unit of the stack in position for removal.

The sheet units of the stack may extend substantially vertically, the longitudinal axis of the stack being substantially horizontal like the stack of newspapers shown in the vending machine illustrated in the above U.S. Pat. No. 4,008,828. In the preferred embodiment, however, the sheet units of the stack extend substantially horizontally, so that the stack is substantially vertical. In such case the sheet units are preferably successively removed from the upper end of the stack and the stack may then be advanced in a vertically upward direction each time a sheet unit has been removed. Alternatively, the sheet units may be successively removed from the lower end of the stack and the stack may then move downwardly under the influence of gravity each time a sheet unit has been removed.

According to another aspect the present invention provides an apparatus for successively removing folded sheet units, such as newspapers, magazines, or the like each comprising superposed sheet layers, from a stack of such sheet units, said apparatus comprising a support for supporting the stack of sheet units, at least one sheet engaging member for engaging with the sheet unit to be removed, and moving means for moving the sheet engaging member so as to remove the sheet unit from the stack, and the apparatus according to the invention is characterized in that said at least one sheet engaging member is mounted so as to be moveable between a retracted inoperative position in which it is out of engagement with the sheet units of the stack, and an extended operative position in which it is engaging between adjacent sheet layers of the sheet unit to be removed adjacent to the fold of the sheet unit.

The sheet engaging member or members may have any suitable shape allowing the member or members to penetrate into the sheet to be removed when the sheet engaging member is moved from the retracted inoperative position to the extended operative position.

When only one sheet engaging member is used it may be arranged at one of the edge portions of the unit extending transversely or at right angles to the fold of the units. In the preferred embodiment, however, a pair of spaced, oppositely directed sheet engaging members for engaging with the sheet unit to be removed are arranged at opposite edge portions of such unit.

Said at least one sheet engaging member may, for example, be a plate like member which may be pointed at its free end, if desired. In the preferred embodiment, however, each sheet engaging member is a pin or rod member. Such pin member may be needle-like and have a pointed free end, or it may have a blunt free end. The pin or rod member or members may be tilted or moved transversely into engagement with the sheet unit between superposed sheet layers. In the preferred embodiment, however, each pin or rod member is axially moveable between said inoperative and operative positions. In such case each pin or rod member preferably extends substantially parallel with the fold of the sheet unit to be removed. When a pair of oppositely directed pin or rod members are used such members may be substantially aligned.

Each sheet engaging member may be moved between its inoperative and operative positions in any suitable manner by driving means which may be electrically or mechanically operated. In the preferred embodiment, such driving means comprise biassing means for biassing each sheet engaging member towards its extended operative position and releasable locking means for releasably retaining the sheet engaging member in its retracted inoperative position.

The moving means of the apparatus may move the sheet unit withdrawn from the stack to any desired position. Thus, the moving means may comprise a guide track extending between a first position adjacent to the fold of the folded unit to be removed from the stack and a second delivery position substantially spaced from the first position, and driving means for moving said at least one sheet engaging member along the guide track between said first and second positions. Such driving means may, for example, comprise a chain or belt.

Activating means, such as cam means or magnetic means, may be located at said second position for moving the at least one sheet engaging member to its retracted position and for activating the locking means, and releasing means may be located at said first position to release the locking means.

This means that the sheet engaging member or members will automatically be moved into the extended operative position in said first position and to its retracted inoperative position in said second delivery position of the track.

The stack support may comprise a substantially horizontally extending support member and means for vertically moving the support member and the stack support so as to maintain the upper folded sheet unit of the stack at a predetermined level when folded sheet units are successively removed from the stack. As each folded sheet unit is slightly thicker at the fold thereof the support member may comprise a resilient rim portion for supporting the superposed folds of the folded units of the stack. This means that the upper folded sheet unit to be removed may be kept substantially plane. The support member may, for example, form the bottom of a box-shaped stack holder or cassette removeably arranged within the apparatus. The sheet units in the apparatus may then rather easily be removed and replaced by another stack of sheet units by interchanging cassettes. This may be rather advantageous, for example when the apparatus forms part of a vending machine for newspapers, magazines, brochures, or the like.

The apparatus may also comprise a transparent front wall through which a folded sheet unit which has been removed from the stack is visible in said second delivery position. When the apparatus forms part of a vending machine the customer may then see the sheet unit he may buy by operating the machine. Thus, the apparatus may comprise means for discharging the folded unit retained in the delivery position from the apparatus when means of payment has been inserted into the apparatus by the customer and accepted by currency accepting means of the apparatus.

The apparatus may further comprise control means for activating the moving means when the folded sheet unit has been discharged so as to move a further folded sheet unit from the first position to said second delivery position. This means that a new folded sheet unit is automatically withdrawn from the stack and brought into the delivery position each time a sheet unit has been withdrawn therefrom.

According to a further aspect the present invention provides a vending machine comprising an apparatus for successively removing folded sheet units, such as newspapers, magazines, and the like each comprising superposed sheet layers, from a stack of such sheet units, said apparatus comprising a support for supporting the stack of sheet units and means for removing a sheet unit from the stack and discharging it to a customer when payment means has been inserted into the machine and accepted, and the vending machine according to the invention is characterized in that the removing means are adapted to move the sheet unit withdrawn from the stack to a display position in which it is visible to the customer, the sheet unit being discharged to the customer from the display position.

It should be understood that the term "folded sheet unit" should cover any flat unit formed by superposed folded sheets. Thus, the term comprises not only newspapers, magazines, booklets, folded carton blanks, and similar paper and/or cardboard products, but also folded blankets, folded fabric, and other folded textiles.

DETAILED DESCRIPTION OF THE INVENTION

Figure 1:
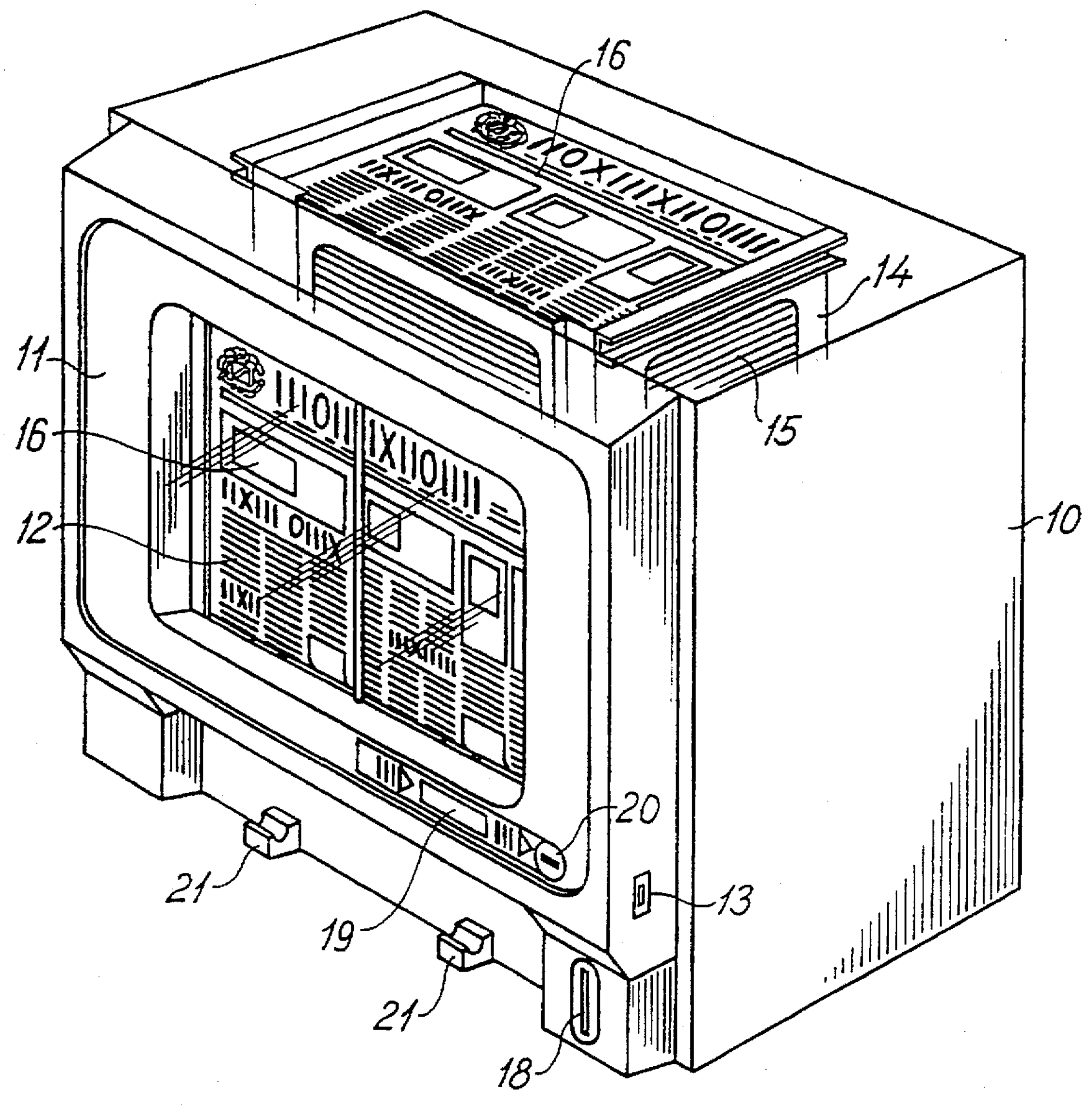
FIG. 1 is a perspective view of the vending machine.

The invention is described in detail with reference to the drawings illustrating a preferred embodiment of the vending machine for newspapers and magazines.

The newspaper vending machine shown in the drawings comprises a box-shaped outer housing 10 which is closed by a hinged outer front door 11 having a window 12 of a transparent material. The outer front door 11 may be locked in its closed position by a key-operated lock 13. A cassette or supply chamber 14 containing a vertical stack 15 of substantially horizontally arranged folded newspapers or other folded sheet units (in the following description only newspapers will be referred to) is removably arranged within the housing 10. Individual newspapers 16 may be successively removed from the upper end of the stack 15 and moved to a display position where the newspaper 16 is visible through the window 12 as described in more detail below. A means of payment, such as a payment card 17 (FIG. 2) may be inserted into a slot 18 defined in the housing 10. The remaining value of the payment card and/or the price of the newspaper may be shown on a display 19 at the lower part of the front door 11. When the payment card 17 has been accepted by the electronic control system of the vending machine and a button or key 20 has been depressed by the customer the newspaper 16 in the display position behind the window 12 will be released from this position. The released newspaper 16 will then drop down to a position in which its lower folded edge is supported by a pair of support brackets 21 from which the newspaper may be removed by the customer. When the newspaper has been released from the display position another newspaper 16 will be moved from the upper end of the stack 15 to the display position behind the window 12 in a manner described in more detail below.

Figure 2:
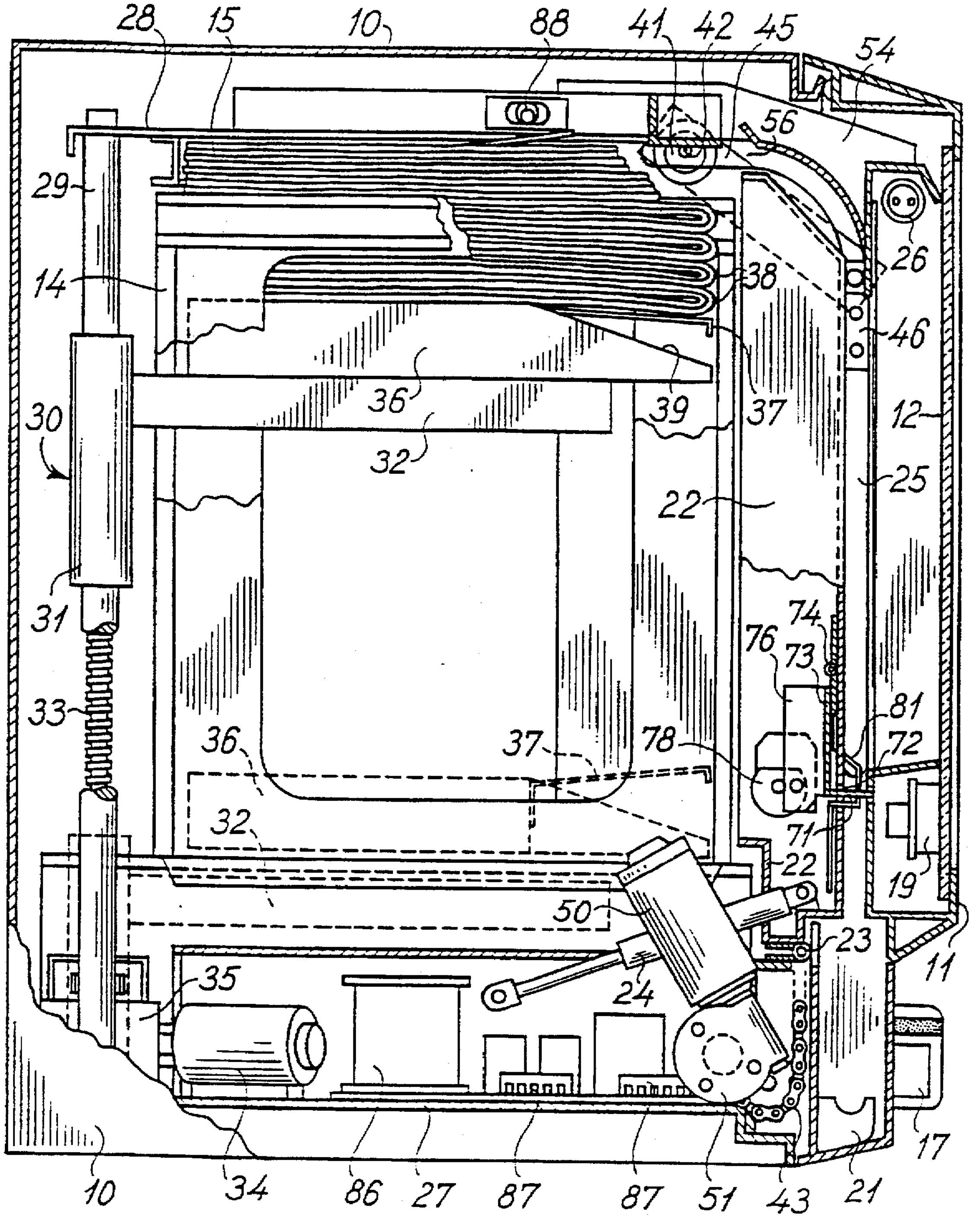
FIG. 2 is a side view of the vending machine, the major part of the housing side wall having been cut away.

As best shown in FIG. 2 the housing 10 also comprises an inner front door 22, which is connected to the housing 10 at its lower end by means of a hinge 23. The movement of the inner front door 22 is controlled by one or more damping cylinders or gas springs 24. The outer and inner front doors 11 and 22, respectively, define a narrow space 25 therebetween for receiving a newspaper 16 in the display position, in which position the newspaper may be illuminated by means of a light source or lamp 26 arranged in the upper part of the outer front door The vending machine comprises an inner structure for receiving the cassette or supply chamber 14. This inner structure comprises a bottom structure 27 for supporting the cassette, a sealing structure 28 defining an upper abutment surface for abutting engagement with the upper newspaper of the stack 15, a pair of guide columns 29 extending vertically and interconnecting the bottom and ceiling structures 27 and 28, respectively, and an elevator 30 comprising guide sleeves 31 displaceably fitting around the guide columns 29 and a horizontally extending platform 32 fastened to the guide sleeves 31. The elevator may be moved vertically along the guide columns 29 by means of a vertically extending threaded shaft 33 which threadingly engages with the elevator 30. The threaded shaft 33 may be rotated by a driving motor 34 via a gear transmission 35. Thus, the elevator 30 may be moved upwardly or downwardly along the guide columns by activating the driving motor 34. The cassette or supply chamber 14 has a bottom frame 36 defining a stack supporting surface and being vertically displaceable in relation to the cassette 14. When the cassette 14 has been inserted in the vending machine, the bottom frame 36 and the stack 15 of newspapers supported thereon may be moved upwardly by moving the elevator 30. The bottom frame 36 comprises a flexible part, such as a flat spring 37 which defines a yieldable support surface for supporting the superposed folded ends 38 of the newspapers in the stack 15. The folded end 38 of a newspaper has a slightly increased thickness, and when the upper newspaper of the stack 15 is moved in abutting engagement with the ceiling structure 28, the flat spring 37 may yield downwardly, if necessary. An inclined surface 39 formed on the bottom frame 36 allows for such deflection.

A mechanism for successively withdrawing the upper newspaper 16 from the stack 15 of newspapers and moving it to the display position will now be described with reference to FIGS. 3 and 4. The withdrawal mechanism comprises a pin member assembly 41 having a pin member 42 which is axially displaceable in relation to the assembly 41 between an extended operative position shown in FIG. 3 and a retracted inoperative position shown in FIG. 4. The pin member assembly 41 is pivotally connected to a driving chain 43 and at 44 via a connecting link 45 and a slide shoe 46. The endless chain 43 engages with upper and lower sprockets 47 and 48, respectively. As indicated in FIG. 4, the vending machine comprises two withdrawal mechanisms 40 arranged at either side of the stack 15 so that the pin members 42 may be inserted into the upper newspaper of the stack 15 from opposite sites close to the folded end 38 of the newspaper as described in more detail below. The lower sprockets 48 are mounted at opposite ends of a common shaft 49, which is in driving engagement with a driving motor 50 via a gear transmission 51 as shown in FIGS. 2 and 4. An upper collar-like part 52 surrounding the pin member 42 and the lower slide shoe 46 are slideably engaging with a slit or slot 53 formed in side wall 54. Thus, by energizing the driving motor 50 the pin assembly 41 may be moved along the slit or slot 53 between an upper paper engaging position and a lower paper disengaging position.

The pin member 42 is mounted on a slide member 57 which is displaceably mounted in relation to a frame part of the pin member assembly 41 in the axial direction of the pin member 42. The slide member 57 and the pin member 42 mounted thereon are biassed towards an extended operative position shown in FIG. 3 under the influence of biassing springs 58 (only one visible in FIGS. 3 and 4). A ramp member or cam member 59 is mounted on either side of the vertical slot part 55 adjacent to its lower end, vide FIG. 4. Each ramp member 59 defines an inclined ramp surface or cam surface 60 adapted to engage with transversely extending lug parts 61 of the slide member 57. Thus, when the pin member assembly 41 passes the ramp members 59 during downward movement towards its lower position, the lug parts 61 engage with the inclined ramp surfaces 60 whereby the slide member 57 and the pin member 42 mounted thereon are moved to a retracted position against the bias of the springs 58. A locking arm 62 of a seesaw-like rocking member 63 is adapted to engage behind an upwardly extending retaining lug 64 of the slide member 57 as shown in FIG. 4, when the latter is in its retracted position. The rocking member 63 is balanced so that the locking arm 62 tends to move downwardly into engagement with the retaining lug 64.

When the pin member assembly 41 is moved upwardly along the slit or slot 53 the collar-like part 52 at last comes into engagement with the horizontally extending part 56, and in this position the pin member assembly 41 is supported by the upper surface of a support lever 65 having a pivot or fulcrum 66. The support lever 65 is biassed clockwise by a tension spring 67 into engagement with a stop member 68 mounted on the side wall 54. This means that the lever arm of the support lever 65 engaging with the pin member assembly 41 may yield downwardly under the bias of the spring 67. When the pin member assembly 41 reaches the end of its upward stroke an upwardly directed actuating arm 69 of the rocking member 63 comes into engagement with a fixed abutment member 70 (FIG. 3) mounted on the side wall 54 at the upper end of the slot 53. This causes the rocking member 63 to tilt so that the locking arm 62 is moved out of engagement with the retaining lug 64 of the slide member 57, and the slide member 57 with the pin member 42 mounted thereon is then returned to its extended operative position under the bias of the springs 58.

Figure 3:
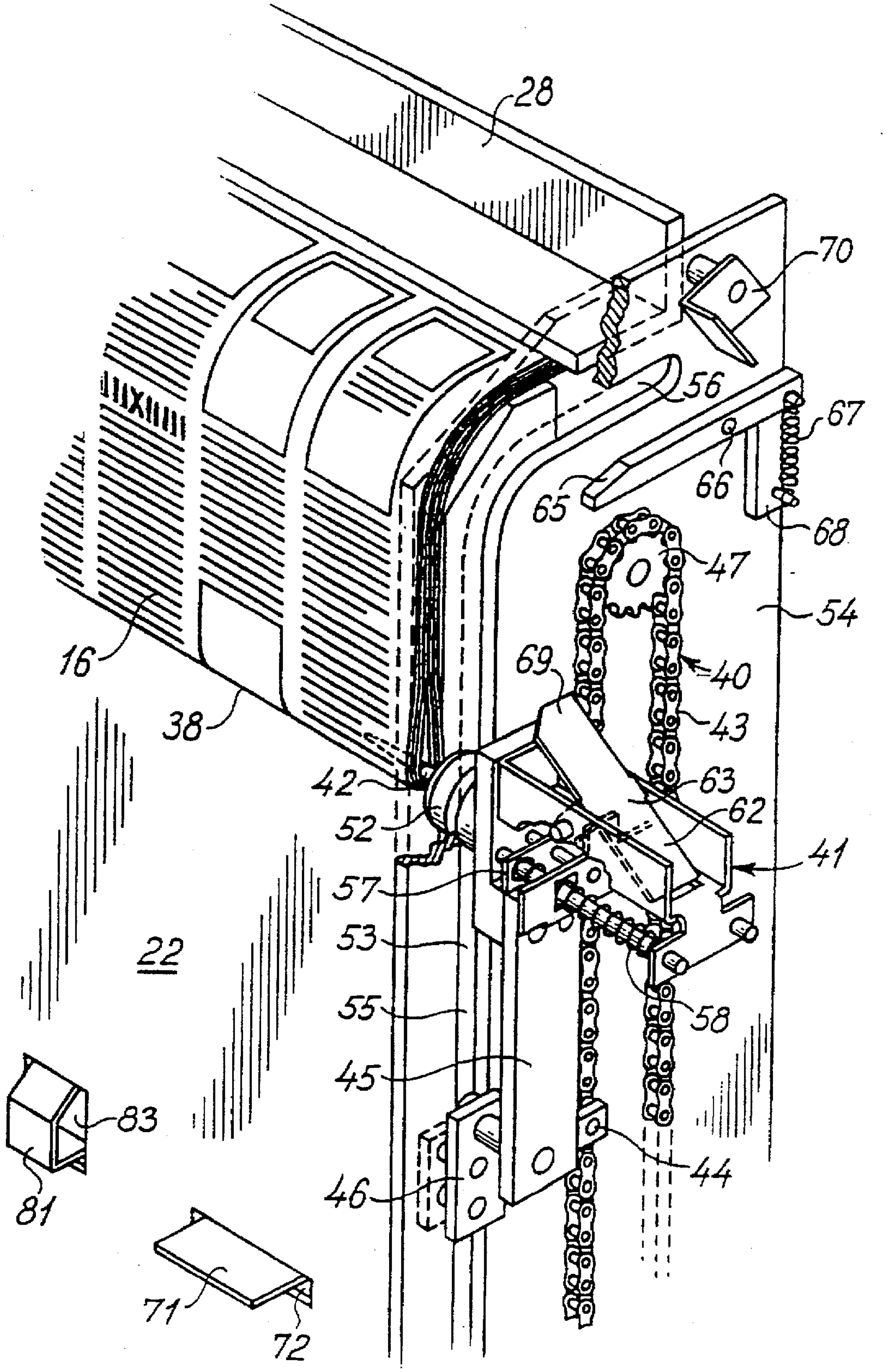
FIGS. 3 and 4 are perspective views illustrating withdrawal of the upper newspaper from a stack of newspapers arranged within the vending machine.
Figure 4:
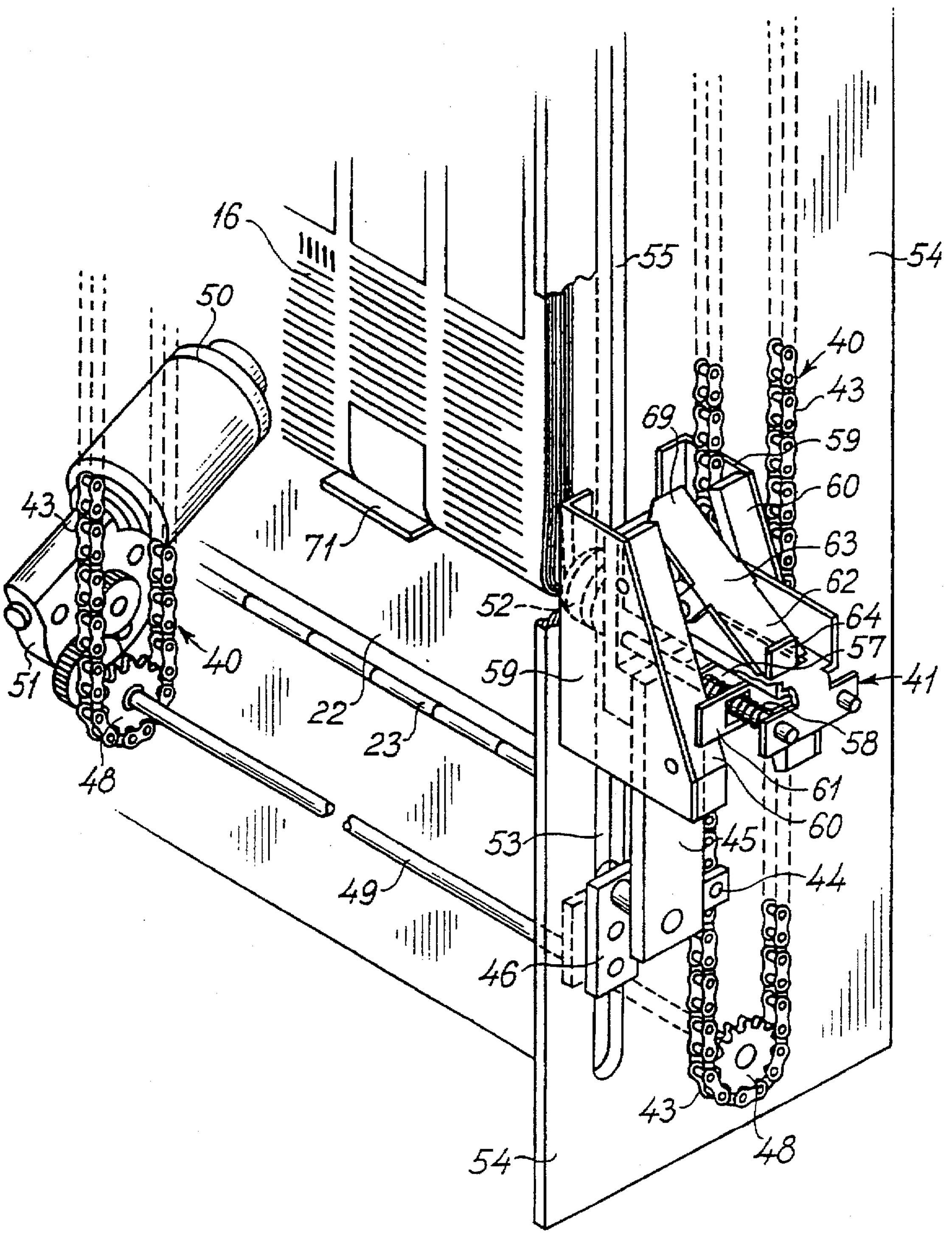
Figure 5:
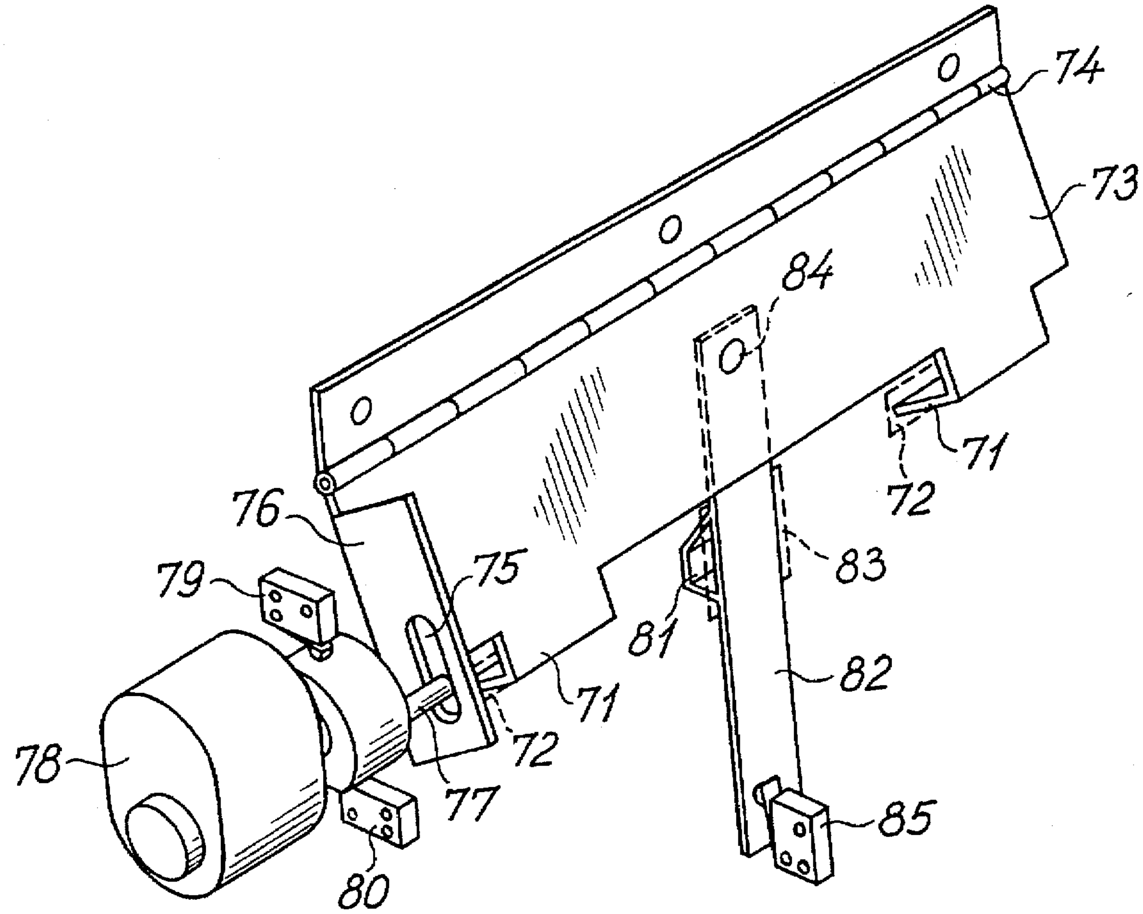
FIG. 5 is a perspective view illustrating a device for releasably retaining a newspaper in a display position.

A newspaper 16 may be retained in the display position behind the window 12 by a pair of supporting fingers 71 extending outwardly through openings 72 formed in the inner front door 22, as shown in FIGS. 2, 3, and 5. The supporting fingers 71 form part of a flap member 73 connected no the inner surface of the inner front door 22 and swingable about a horizontally extending hinge 74. An elongated opening 75 formed in a bent flange part 76 of the flap member 73 cooperates with an excentric stud 77 driven by a driving motor 78. The driving motor 78 is controlled by microswitches 79 and 80 so that the flap member 73 may be moved by the motor 78 between an extended position in which the fingers 71 extend through the openings 72 into the narrow space 25 and a retracted position in which the fingers 71 are retracted from the narrow space 25 between the outer and inner front doors 11 and 22, respectively. A sensing member 81, which is formed on a flexible arm 82, extends through an opening 83 in the inner front door 22, as shown in FIGS. 2, 3 and 5. The upper end of the flexible arm 82 is arranged between the flap member 73 and the inner surface of the inner front door 22 and is fastened to the latter at 84. The lower end of the flexible arm 82 cooperates with a microswitch 85 for checking whether the sensing member 81 extends into the narrow space 25 or has been displaced therefrom. The sensing member 81 and the microswitch may be replaced by a photoelectric sensor or any other suitable sensing device.

As shown in FIG. 2, the vending machine further comprises a transformer 86 for stepping down the voltage of the electric power supplied and an electronic control device 87 for controlling the operation of the vending machine based on signals received from the push button 20, the various microswitches and sensors, and from a value sensor (not shown) for sensing the value and validity of a payment card 17 or other payment means inserted into the slot 18. The vertical position of the lower newspaper abutment surface of the ceiling structure 28 may be adjusted by means of a pin-slot arrangement 88 (FIG. 2). Thus, the vertical distance between the lower newspaper engaging surface of the ceiling structure 28 and the central axis of the pin members 42 in their upper position shown in FIG. 2 may be adjusted to approximately half the thickness of one individual newspaper at its folded end 38.

The vending machine illustrated in the drawings operates as follows:

In the starting position a newspaper 16 is in the display position within the narrow space 25 and its lower folded edge is supported by the fingers 71 which extend through the openings 72 into the narrow space 25. The sensing member 81 is displaced from the space 25 by the newspaper located therein, and signals from the microswitches 79, 80 and 85 indicate to the control device 87 that a newspaper is correctly positioned in the display position and is ready for being released to a customer. The elevator 30 has been moved to such a position that the upper newspaper 16 in the stack 15 is in abutting engagement with the lower surface of the ceiling structure 28. The pin member assemblies 41 are in their upper positions, and the slide members 57 have been released by the abutment members 70 so that the pin members 42 have been moved to their extended operative positions by the springs 58. This means that the pin members 42 are extending inbetween adjacent sheet layers of the upper newspaper 16 in the stack 15 substantially parallel with and adjacent to the folded end 38 thereof.

When a customer inserts a payment card 17 into the slot 18 the validity of the card is checked, and the remaining value of the card is read. The remaining value of the card and/or the price of the newspaper and optionally other information may be displayed to the customer by the display 19. When the payment card has been accepted the customer may depress the button or key 20. Now, the driving motor 78 is operated so as to swing the flap member 73 inwards whereby the support fingers 71 are withdrawn from the narrow space 25. The displayed newspaper 16 is then dropped from the display position to a position in which its lower end is supported by the support brackets 21 shown in FIG. 1. The customer may now grasp and withdraw the newspaper from the vending machine. When the newspaper has been withdrawn the sensing member 81 is returned to its extended position by the resiliency of the flexible arm 82 and this is indicated to the control device 87 by the microswitch 85. Now, also the supporting fingers 71 are returned to their extended position by the motor 78, and the driving motor 50 is energized so as to cause movement of the pin member assemblies 41 from their upper to their lower position, whereby the upper newspaper 16 of the stack 15 is withdrawn from the snack and moved into the display position. When the pin member assemblies 41 reach their lower position the slide members 57 and the pin members 42 mounted thereon are retracted by the ramp members 59 and locked in their retracted position by the locking arm 62 of the rocking member 63. When the newspaper 16 is moved to the display position it displaces the sensing member 81 from the narrow space 25. The microswitch 85 then signals to the control device 87 that another newspaper 16 has been correctly positioned in the narrow space 25, and the driving motor 34 may now be energized to move the elevator 30 upwardly so as to place the upper newspaper 16 of the stack 15 in engagement with the lower surface of the ceiling structure 28. Thereafter, the driving motor 50 is energized so as to move the pin member assemblies 41 back into their upper positions in which the actuating arms 69 of the rocking members 63 are hit by the respective abutment members 70 so as to release the slide members 57. The slide members 57 and the pin members 42 mounted thereon will then be biassed to their extended positions by the biassing springs 58 so that the pin members 42 are moved inbetween adjacent layers of the upper newspaper 16 of the stack 15 substantially parallel with and adjacent to the folded end 38. Now, the vending machine is again in the starting position described above and is ready to be operated by another customer.

It should be understood that various amendments and modifications of the vending machine shown in the drawings and described above could be made within the scope of the present invention. Thus, the principle described for successively withdrawing individual newspapers from a stack of newspapers could also be used in other kinds of dispensing apparatuses in which folded sheet units each comprising superposed sheet layers should be dispensed successively.

We claim:

1. An apparatus for successively removing folded sheet units, such as newspapers, magazines, or the like from a stack of such sheet units, each sheet unit consisting of superposed sheet layers and forming a fold said apparatus comprising:

a support for supporting the stack of sheet units, at least a first sheet engaging member for engaging with the sheet unit to be removed, moving means for moving the sheet engaging member so as to remove the sheet unit from the stack, said moving means including;

a guide columns extending between a first position adjacent to the fold of the folded unit to be removed from the stack and a second delivery position substantially spaced from the first position, and driving means for moving said at least one sheet engaging member along the guide columns between said first and second positions;

said at least first sheet engaging member being mounted so as to be moveable between a retracted inoperative position in which it is out of engagement with the sheet units of the stack, and an extended operative position in which it is engaging the fold between adjacent sheet layers of the sheet unit which is to be removed.

2. An apparatus according to claim 1 further comprising second sheet engaging member forming a pair of spaced, oppositely directed sheet engaging members for engaging with the sheet unit at opposite edges of the fold.

3. An apparatus according to claim 2, wherein the pair of oppositely directed sheet engaging members are substantially aligned with one another.

4. An apparatus according to claim 2, wherein said sheet engaging members are a pair of rods which are axially movable between said inoperative and operative positions, and the rods are substantially aligned with one another.

5. An apparatus according to claim 2, wherein said at least first sheet engaging member is a pin.

6. An apparatus according to claim 5, wherein the pin is axially moveable between said inoperative and operative positions.

7. An apparatus according to claim 1 wherein an engaging member includes means for biassing towards its extended operative position and releasable locking means for releasably retaining in its retracted inoperative position.

8. An apparatus according to claim 1, further comprising activating means located at said second position for moving said at least one sheet engaging member to its retracted position and for activating the locking means, and releasing means located at said first position to release the locking means.

9. An apparatus according to claim 1, wherein the stack support comprises a substantially horizontally extending support member and means for moving the support member and the stack supported thereby vertically so as to maintain the upper folded sheet unit of the stack at a predetermined level when folded sheet units are successively removed from the stack.

10. An apparatus according to claim 9, wherein the support member comprises a resilient rim portion for supporting the superposed folds of the folded units of the stack.

11. An apparatus according to claim 9, wherein the support member forms the bottom of a box-shaped stack holder or cassette arranged removably within the apparatus.

12. An apparatus according to claim 1, further comprising a transparent front wall, a folded sheet unit removed from the stack being visible through the front wall in said second delivery position.

13. An apparatus according to claim 1, further comprising means for discharging the folded unit retained in the delivery position from the apparatus when means of payment has been inserted into and accepted by the apparatus.

14. An apparatus according to claim 13, further comprising control means for activating the moving means when the folded unit has been discharged so as to move a further folded sheet unit from said first position to said second delivery position.

15. A vending machine comprising an apparatus for successively removing folded sheet units, such as newspapers, magazines, and the like from a stack of such sheet units, each sheet unit consisting of superposed sheet layers forming a fold said vending machine comprising:

support for supporting the stack of sheet units, means for withdrawing a sheet unit from the stack, means for moving the withdrawn sheet unit to a display position in which it is visible to a customer, means for insertion of payment means and acceptance of payment, and means for discharging the sheet unit from the display position in response to acceptance of payment.

16. A vending machine according to claim 15, wherein the display position is defined behind a transparent front wall part of the vending machine.

17. A vending machine according to claim 15, including a vertically extending narrow space or slot in which the sheet unit is positioned in said display position.

18. A vending machine according to claim 17, further comprising retractable support means for supporting a lower edge portion of a sheet unit in the display position.

19. A vending machine according to claim 18, further comprising control means for retracting the support means from said slot when payment means has been inserted into the vending machine and accepted, whereafter the sheet unit displayed is discharged and may be removed from the machine.

20. A vending machine according to claim 15, wherein the withdrawing means comprises at least a first sheet engaging member mounted so as to be moveable between a retracted inoperative position in which it is out of engagement with the sheet units of the stack, and an extended operative position in which it is engaging the fold between adjacent sheet layers of the sheet unit which is to be withdrawn.

21. A vending machine according to claim 20, further comprising a second sheet engaging member and forming a pair of axially spaced, oppositely directed sheet engaging members for engaging with the sheet unit at opposite edges of the fold.

22. A vending machine according to claim 22, wherein said at least first sheet engaging member is a pin.

23. A vending machine according to claim 22, wherein the pin is axially moveable between said inoperative and operative positions.

24. A vending machine according to claim 21, wherein the oppositely directed sheet engaging members are axially movable and substantially aligned with one another.

25. A vending machine according to claim 20, further comprising biassing means for biassing each sheet engaging member towards its extended operative position and releasable locking means for releasably retaining in its retracted, inoperative position.

26. A vending machine according to claim 25, wherein the withdrawing means comprise a guide columns extending from a first position adjacent to the fold of the folded unit to be withdrawn from the stack, and a second delivery position substantially spaced from the first position, and driving means for moving said at least first sheet engaging member along the guide columns between said first and second positions.

27. A vending machine according to claim 26, further comprising activating means located at said second position for moving said at least first sheet engaging member to its retracted position, for activating the locking means, and releasing means located at said first position to release the locking means.

28. A vending machine according to claim 15, wherein the stack support comprises a substantially horizontally extending support member and means for moving the support member and the stack supported thereby vertically so as to maintain the upper folded sheet unit of the stack at a predetermined level when folded sheet units are successively withdrawn from the stack.

29. A vending machine according to claim 28, wherein the support member comprises a resilient rim portion for supporting the superposed folds of the folded units of the stack.

30. A vending machine according to claim 28, wherein the support member forms the bottom of a box-shaped stack holder or cassette arranged removably within the vending machine.

31. A vending machine according to claim 20, wherein said at least first sheet engaging member is a rod.

32. A vending machine according to claim 31, wherein the rod is axially moveable between said inoperative and operative positions.

33. An apparatus for successively removing folded sheet units, such as newspapers, magazines, or the like from a stack of such sheet units, each sheet unit consisting of superposed sheet layers and forming a fold said apparatus comprising:

a support for supporting the stack of sheet units, at least a first sheet engaging member for engaging with the sheet unit to be removed, moving means for moving the sheet engaging member so as to remove the sheet unit from the stack, said at least first sheet engaging member being mounted so as to be between a retracted inoperative position in which it is out of engagement with the sheet units of the stack, and an extended operative position in which it is engaging the fold between adjacent sheet layers of the sheet unit which is to be removed, and wherein an engaging member includes means for biasing towards its extended operative position and releasable locking means for releasably retaining in its retracted inoperative position.

34. An apparatus for successively removing folded sheet units, such as newspapers, magazines, or the like from a stack of such sheet units, each sheet unit consisting of superposed sheet layers and forming a fold said apparatus comprising:

a support for supporting the stack of sheet units, at least a first sheet engaging member for engaging with the sheet unit to be removed, moving means for moving the sheet engaging member so as to remove the sheet unit from the stack, said at least first sheet engaging member being mounted so as to be moveable between a retracted inoperative position in which it is out of engagement with the sheet units of the stack, and an extended operative position in which it is engaging the fold between adjacent sheet layers of the sheet unit which is to be removed;

wherein the moving means includes a guide columns extending between a first position adjacent to the fold of the folded unit to be removed from the stack and a second delivery position substantially spaced from the first position, and driving means for moving said at least one sheet engaging member along the guide columns between said first and second positions, and further comprising a transparent front wall, a folded sheet unit removed from the stack being visible through the front wall in said second delivery position.

35. A vending machine comprising an apparatus for successively removing folded sheet units, such as newspapers, magazines, and the like from a stack of such sheet units, each sheet unit consisting of superposed sheet layers forming a fold said vending machine comprising:

support for supporting the stack of sheet units, means for withdrawing a sheet unit from the stack, means for moving the withdrawn sheet unit to a display position in which it is visible to a customer, means for discharging the sheet unit from the display position in response to insertion of payment means and acceptance of payment, said means for withdrawing including a sheet engaging member mounted so as to be moveable between a retracted inoperative position in which it is out of engagement with the sheet units of the stack, and an extended operative position in which it is engaging the fold between adjacent sheet layers of the sheet unit which is to be withdrawn, and biasing means for biasing the sheet engaging member towards its extended operative position and releasable locking means for releasably retaining the sheet engaging member in its retracted, inoperative position.

* * * * *